United States Patent
Moon et al.

(12)

(10) Patent No.: US 6,420,496 B1
(45) Date of Patent: Jul. 16, 2002

(54) REACTION PRODUCT OF PHENOL-ALDEHYDE WITH POLYAMINE(-EPOXY ADDUCT) AND PROTON DONOR

(75) Inventors: Robert M. Moon, Horsham; Shailesh Shah, Dresher; Anbazhagan Natesh, North Wales; Gaetano D. DeAngelis, Alburtis; Joseph L. Mulvey, Lansdale; Ronald T. Cash, Jr., North Wales, all of PA (US)

(73) Assignee: Cognis Corporation, Gulph Mills, PA (US)

( * ) Notice: Subject to any disclaimer, the term of this patent is extended or adjusted under 35 U.S.C. 154(b) by 0 days.

(21) Appl. No.: 09/415,157

(22) Filed: Oct. 8, 1999
(Under 37 CFR 1.47)

Related U.S. Application Data

(63) Continuation-in-part of application No. PCT/US99/16696, filed on Aug. 3, 1999.
(60) Provisional application No. 60/095,097, filed on Aug. 3, 1998.

(51) Int. Cl.[7] .............................. C08G 8/28; C08G 8/32
(52) U.S. Cl. ...................................... 525/504; 525/481
(58) Field of Search ................................. 525/481, 504

(56) References Cited

U.S. PATENT DOCUMENTS

| | | | |
|---|---|---|---|
| 4,269,742 A | 5/1981 | Goeke et al. ................... 260/18 |
| 4,304,700 A | 12/1981 | Shimp et al. ................ 525/526 |
| 5,075,411 A | 12/1991 | Ogawa et al. ................. 528/99 |
| 5,096,556 A | 3/1992 | Corrigan et al. ............ 523/403 |
| 5,098,986 A | 3/1992 | Speranza et al. ............ 528/149 |
| 5,576,108 A | 11/1996 | Neumann et al. ............ 428/413 |

FOREIGN PATENT DOCUMENTS

| | | |
|---|---|---|
| DE | 1953643 | 7/1979 |
| GB | 1 457 932 | 12/1976 |
| GB | 2 050 381 | 7/1981 |
| JP | 55-116717 A * | 9/1980 |
| JP | 58-187462 | 11/1983 |
| JP | 60-49025 | 3/1985 |
| JP | 04-161420 | 6/1992 |

* cited by examiner

*Primary Examiner*—Robert E. L. Sellers
(74) *Attorney, Agent, or Firm*—John E. Drach; Henry E. Millson, Jr.

(57) ABSTRACT

A curing agent for epoxy resins is prepared by (1) reacting a phenol and an aldehyde in the presence of a basic catalyst to form a first reaction product, (2) reacting the first reaction product with a polyamine or a polyamine-epoxy adduct to form a second reaction product containing unreacted primary amine groups, and (3) reacting the second reaction product with a proton donor compound having a $pK_a$ value of 11 or less to form the curing agent.

8 Claims, No Drawings

REACTION PRODUCT OF PHENOL-ALDEHYDE WITH POLYAMINE(-EPOXY ADDUCT) AND PROTON DONOR

CROSS-REFERENCE TO RELATED APPLICATIONS

This application claims is a continuation-in-part of copending International application PCT/US99/16696, filed Aug. 3, 1999, which claims priority of provisional application U.S. Ser. No. 60/095,097 filed Aug. 3, 1998, the disclosure of which is hereby incorporated by reference.

BACKGROUND OF THE INVENTION

Amine-functional epoxy curing agents for coatings and related applications have been known and described in the art. These have included reaction products of diamines and/or polyamines with: (1), epoxy resins or other epoxy-functional materials to produce the commonly designated amine adducts; (2) phenol or various substituted phenols and formaldehyde or other aldehydes to produce the commonly designated Mannich bases; and (3) various acidic hydrogen donors such as phenols or various substituted phenols to produce designated amine salts. See, e.g., *Encyclopedia of Polymer Science and Engineering* 6:322–82 (1986) and references cited therein. Nevertheless, there exists still in the art a need for low temperature epoxy curing agents having improved properties and handling characteristics.

BRIEF SUMMARY OF THE INVENTION

It was discovered that by completely blocking or "salting" most or all of the primary amine groups of an amine-functional epoxy curing agent with an acidic hydrogen donor group, it was possible to produce amine-functional epoxy curing agents that do not exhibit reaction with atmospheric carbon dioxide and moisture to produce the bicarbonates or carbamates characterized as amine "blush." It was further discovered that such curing agents exhibited very rapid cure response when reacted with epoxy resins and other epoxy-functional materials, and that by judicious choice of ingredients, such systems exhibited excellent cure characteristics at significantly lower temperatures than previously attainable. It was further discovered that if an amine adduct produced by the reaction of diamines and/or polyamines with an epoxy resin or other epoxy functional material was further reacted with sufficient acidic hydrogen donor groups to block or "salt" most or all of the remaining primary amine groups, the curing agent thus produced also did not exhibit reaction with atmospheric carbon dioxide and moisture, and also exhibited excellent low temperature cure characteristics. It was further discovered that if a Mannich base, produced by the reaction of diamines and/or polyamines or polyamine-epoxy adducts with the reaction product of a phenolic compound and formaldehyde or other aldehyde, was further reacted with sufficient acidic hydrogen donor groups to block or "salt" most or all of the remaining primary amine groups, the curing agent thus produced also did not exhibit reaction with atmospheric carbon dioxide and moisture, and also exhibited excellent low temperature cure characteristics. It was further discovered that all the curing agents described in the foregoing exhibited the positive attributes of their respective classes, such as hardness, toughness, chemical resistance and corrosion resistance.

DETAILED DESCRIPTION OF THE INVENTION

Other than in the operating examples, or where otherwise indicated, all numbers expressing quantities of ingredients or reaction conditions used herein are to be understood as modified in all instances by the term "about".

In one important embodiment of the invention epoxy curing agents are formed by (1) reacting at least one phenol with at least one aldehyde in the presence of a basic catalyst, (2) reacting the resulting product with at least one polyamine or a polyamine-epoxy adduct, and finally (3) reacting the product of the preceding step with at least one proton donor compound having a $pK_a$ of 11 or less to form the epoxy curing agent. The amine-functional epoxy curing agents thus formed exhibit the performance properties of known epoxy curing agents, with the additional benefits of extraordinarily rapid ambient temperature cure response and excellent cure response at very low temperatures, together with complete resistance to formation of amine bicarbonates or carbamates.

The phenol used in the first step to prepare the curing agents of the invention can be any compound which contains at least one hydroxyl group attached to at least one aromatic ring. The aromatic ring(s) may have one or more substituents such as alkyl groups, so long as at least one carbon atom located at the 1, 4 or 6 positions relative to the hydroxyl bearing carbon atom is unsubstituted. Preferably the phenolic compounds are represented by the formula:

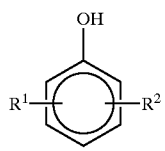

wherein $R^1$ and $R^2$ are independently hydrogens or hydrocarbyl groups having from 1 to 16 carbon atoms. $R^1$ and $R^2$ can be linear, branched or aromatic. Examples of suitable phenolic compounds include, but are not limited to, phenol; nonylphenol; resorcinol; butylphenol; ortho; meta and para cresols; hydroquinone; paraphenylphenol; dodecylphenol; 4,4'-dihydroxy-2,2-diphenylpropane (Bisphenol A); p-t-butyl phenol; and 2-hydroxybenzoic acid (salicylic acid).

The aldehyde used in step (1) can be any aldehyde that will react with a phenol to form a methylol phenol. Such aldehydes include, but are not limited to, formaldehyde paraformaldehyde; acetaldehyde; butyraldehyde; and other aliphatic aldehydes; with formaldehyde and paraformaldehyde being preferred.

The basic catalyst used in the reaction between the phenol and the aldehyde in step (1) can be any base known to those skilled in the art typically used in the reaction of a phenol and an aldehyde. Preferably, the catalyst is an amine, more preferably N,N-dimethylbenzyl amine (BDMA).

Step (1) can be carried out at a temperature of from 20° to 120° C., preferably at about 100° C. The reaction is conveniently carried out in aqueous solution. The mole ratio of phenol to aldehyde can range from 1:1 to 6:1, preferably from 1.5:1 to 3:1.

The polyamines used in step (2) can be any amine having two or more primary amine functionalities, including those compounds having secondary amine functionalities in addition to the two or more primary amine groups. Diamines and polyamines that can be employed in step (2) are preferably those represented by the formula

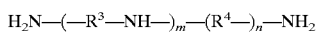

wherein $R^3$ and $R^4$ are divalent hydrocarbyl groups, preferably having 2 to 20 carbon atoms, and m and n are integers ranging from 0 to 5, with the condition that m and n may not both be simultaneously 0 (m+n is at least 1). The hydrocarbyl groups may be branched or linear alkylene groups, cycloaliphatic groups or contain aromatic groups so long as the attached amines are primary or secondary aliphatic amines.

Examples of diamines and polyamines that can be used herein include, but are not limited to: 1,3-benzenedimethanamine (MXDA); metaxylylene diamine; 1,3-cyclohexanedimethanamine (1,3-BAC); 1,2-diaminocyclohexane (DACH); norbornanediamine; isophorone diamine; 5-amino-1,3,3-trimethylcyclohexanemethanamine (IPDA); trimethylhexamethylenediamine (TMD); 1,3-pentanediamine (DYTEK™ EP); 2-methyl-1,5-pentanediamine (DYTEK™ A); 1,6-hexanediamine (HMDA); 4,4'-diaminodicyclohexylmethane (PACM); and ethyleneamines such as 1,2-ethanediamine (EDA), N-(2-aminoethyl)-1,2-ethanediamine (DETA), N,N-bis(2-aminoethyl)-1,2-ethanediamine (TETA), N-(2-aminoethyl)-N'-[(2-amino-ethyl)amino-ethyl]-1,2-ethanediamine (TEPA), aminoethylpiperazine, and higher polyethylenepolyamines.

Epoxy functional materials useful in preparing the polyamine-epoxy adducts that can be used in step (2) include, but are not limited to: Bisphenol A epoxy resins, such as the common diglycidyl ether of Bisphenol EA with epoxy equivalent weights ranging from 170–525; Bisphenol F epoxy resins, such as the common diglycidyl ether of Bisphenol F with epoxy equivalent weights ranging from 156–190; Bisphenol F epoxy novolac resins; cresol epoxy novolac resins; and various mono-, di- and tri-functional reactive epoxy "diluents," such as butyl glycidyl ether, $C_8$–$C_{10}$ alkyl glycidyl ethers, $C_{12}$–$C_{13}$ alkyl glycidyl ethers, $C_{12}$–$C_{14}$ alkyl glycidyl ethers, cresyl glycidyl ether, 1,4-butanediol diglycidyl ether, neopentyl glycol diglycidyl ether, resorcinol diglycidyl ether, and other glycidyl ethers.

The above epoxy functional materials are reacted with a diamine or polyamine, such as those described above, to form the polyamine-epoxy adduct that can be used in step (2) above. This reaction can be carried out at a temperature of from 20° C. to 80° C. or higher depending on the reactants. They can be prepared by methods known in the art for the preparation of such adducts.

The step (2) reaction can be carried out at a temperature of from 80 to 175° C., preferably from 125 to 160° C. The mole ratio of polyamine or polyamine-epoxy adduct to the reaction product from step (1) can range from 1:1 to 10:1, preferably from 2:1 to 4:1.

The proton donor used in step (3) can be any compound having a $pK_a$ value of 11 or less. Such compounds include Lewis acids, Bronsted acids, and protonic acids. Examples of such acids include but are not limited to protonic acids such as carboxylic acids, strong mineral acids, phenols, and substituted phenols, including Bisphenol A.

Preferably, at least 0.8, and more preferably, at least 1.0 equivalents of proton donor are present for each equivalent of primary amine group in the polyamine or polyamine-epoxy adduct present in the reaction product of step (2) or in the polyamine-epoxy adduct when this is used as the curing agent; i.e., at least 80% and preferably 100% of the primary amine groups are reacted with the proton donor.

Step (3) is preferably carried out at a temperature of from 20 to 175° C.

The above reaction sequence is conveniently carried out at least partially in a single reaction vessel, wherein the phenol is added in a stoichiometric excess such that it acts as the proton donor in the final step.

The curing agent from step (3) above or the polyamine-epoxy adduct reacted with the proton donor can then be used to cure the epoxy resin.

The curing agents of the invention are present in an amount effective to cure the epoxy resin.

Due to the rapid cures provided by present curing agents, accelerators are not required. However, they can be utilized, if desired to even further increase the cure rate of the epoxy resin-curing agent system. Various amine-compatible accelerators can be used as long as they are soluble in the curing agent. Examples of useful accelerators include 2,4,6-tris (dimethylaminomethyl)phenol, N,N-di-ethylethanolamine, N,N-dimethylbenzylamine and the like. Typical concentrations of such accelerators, if present, may be from 0.1% to 10% of the curing agent, preferably from 1% to 5%.

The epoxy resin can be any epoxy resin which can be cured by the curing agent. Generally, the epoxy resin can be any curable epoxy resin having a 1,2-epoxy equivalency of one or more, and preferably, on the average, about 1.5 or more epoxide groups per molecule. The epoxy resin can be saturated or unsaturated, linear or branched, aliphatic, cycloaliphatic, aromatic or heterocyclic, and may bear substituents which do not materially interfere with the curing reaction. Such substituents can include bromine. The epoxy resin may be monomeric or polymeric, liquid or solid, but is preferably liquid at room temperature. Suitable epoxy resins include glycidyl ethers prepared by reacting epichlorohydrin with a compound containing at least one, preferably two or more, hydroxyl groups carried out under alkaline reaction conditions. Examples of epoxy resins suitable for use in the invention include polyglycidyl ethers of polyhydric phenols, epoxy novolacs or similar glycidated polyphenolic resins, polyglycidyl ethers of alcohols, glycols or polyglycols, and polyglycidyl esters of polycarboxylic acids.

The preferred epoxy resin is a resin based on a polyglycidyl ether of a polyhydric phenol. Polyglycidyl ethers of polyhydric phenols can be produced, for example, by reacting an epihalohydrin with a polyhydric phenol in the presence of an alkali. Examples of suitable polyhydric phenols include: 2,2-bis(4-hydroxyphenyl) propane (Bisphenol-A); 2,2-bis(4-hydroxy-3-tert-butylphenyl) propane; 1,1-bis(4-hydroxyphenyl) ethane; 1,1-bis(4-hydroxyphenyl) isobutane; bis(2-hydroxy-1-naphthyl)methane; 1,5-dihydroxynaphthalene; 1,1-bis(4-hydroxy-3-alkylphenyl) ethane and the like. Suitable polyhydric phenols can also be obtained from the reaction of phenol with aldehydes such as formaldehyde (bisphenol-F). Fusion products of these polyglycidyl ethers of polyhydric phenols with phenolic compounds such as bisphenol-A are also suitable as epoxy resins, such as those described in U.S. Pat. No. 3,477,990 and U.S. Pat. No. 4,734,468. Commercial examples of preferred epoxy resins include, for example, EPON® Resins 862, 828, 826, 825 and 1001 available from Shell Chemical Company and commercially available epoxy resins from Dow Chemical Company such as DER™330, DER™331, DER™354, DER™661, and DER™671.

These preferred epoxy resins may also optionally be blended with a glycidyl ether of an aliphatic or aromatic alcohol, glycol or polyglycol, or a glycidyl ester of a monocarboxylic acid. Examples include butyl glycidyl ether, phenyl glycidyl ether, cresyl glycidyl ether, 1,4-butanediol diglycidyl ether, the glycidyl ester of neodecanoic acid, and the like. These glycidyl ethers and esters may be blended with the preferred epoxy resin in concentrations of from 1% to 50% in order to affect properties such as wetting characteristics, viscosity, flexibility, adhesion characteristics, and so forth. EPON® Resins 815, 813, and 8132 (available from Shell Chemical Company) and DER™324 (available from Dow Chemical Company) are examples of preferred epoxy resins containing such modifiers.

The preferred epoxy resin systems of the invention may contain one or more epoxy resins and a curing agent of the invention. The epoxy resin can be blended or mixed with the curing agent simultaneously or in any order at a temperature below the curing temperature which is typically below about 100° C.

The curable epoxy resin composition can be cured at a temperature as low as −40° C., preferably from −10° C. to 150° C., for a time effective to cure the epoxy resin. For standard ambient cure applications the composition is preferably cured at ambient temperature from 15° C. to 40° C.

Further to facilitate handling or application or use in various environments, the curing agent or the epoxy resin system can be diluted with minor amounts of compatible solvents such as, but not limited to, aliphatic or aromatic hydrocarbons, alcohols, glycol ethers, ketones, and esters.

The epoxy resin composition of the invention may include other additives, such as flow control additives, antifoam agents, or anti-sag agents, as well as other additives such as pigments, reinforcing agents, fillers, elastomers, stabilizers, extenders, plasticizers, or flame retardants depending on the application.

The epoxy resin composition is useful for applications such as, but not limited to, adhesives, coatings, flooring, casting and encapsulants.

The curable epoxy resin composition can be applied by brush, roller, spray, squeegee or other means, or poured or injected into a suitable mold and allowed to cure.

The following examples illustrate the invention more fully, but are not intended to be or to be construed as a limitation on the scope of the invention.

EXAMPLE 1

|  | Wt. Ratio | Wt. % | grams |
| --- | --- | --- | --- |
| Paraformaldehyde 95% | 63.16 | 5.57 | 38.1 |
| DI H$_2$O | 100. | 8.82 | 60.3 |
| BDMA* | 11.34 | 1.00 | 6.8 |
| Nonyl Phenol | 660. | 58.22 | 398.2 |
| MXDA** | 299.2 | 26.39 | 180.5 |
|  | 1133.70 | 100.00 | 683.9 |
| Water loss | −139.16 | −12.27 | −83.9 |
| Yield | 994.54 | 87.73 | 600.00 |

*N,N-dimethylbenzyl amine
**1,3-benzenedimethanamine

1. Added first four ingredients, in order, to reactor equipped with a cold condenser
2. Heated slowly to 60° C.
3. Held 2 hours
4. Heated to 100° C.
5. Added MXDA
6. Held 30minutes
7. Switched to Mannich setup ***
8. Heated to 150° C.
9. Pulled vacuum to 50 mm Hg
10. Held 15 minutes
11. Vacuum broken with N$_2$
12. Cooled and discharged

*** By Mannich setup is meant attaching a hot air condenser to the reactor, adding a connector to the cold condenser, adding a vacuum connection, and adding a receiver to the system.

| Product Clarity | Clear, no haze |
| --- | --- |
| AmV | 253.6 |
| Visc @ 25° C. | 614 poise |
| Gel Time (113.0/87.0) | 18' 29" |
| Tack-Free      )25° C. | 1.875 (1:52.5) |
| Thru-Cure      ) | 2.875 (2:52.5) |
| Tack-Free      )40° F. | 3.375 (3:22.5) |
| Thru-Cure      ) | 8.375 (8:22.5) |

EXAMPLE 2

|  | Wt. Ratio | Wt. % | grams |
| --- | --- | --- | --- |
| Paraformaldehyde 95% | 63.16 | 5.96 | 41.1 |
| DI H$_2$O | 100. | 9.43 | 65.1 |
| BDMA | 10.6 | 1.00 | 6.9 |
| Nonyl Phenol | 660. | 62.24 | 429.9 |
| DETA* | 226.6 | 21.37 | 147.6 |
|  | 1060.36 | 100.00 | 690.6 |
| Water loss | −139.16 | −13.12 | −90.6 |
| Yield | 921.20 | 86.88 | 600.00 |

*N-(2-aminoethyl)-1,2-ethanediamine

1. Added first four ingredients, in order, to reactor with cold condenser
2. Heated slowly to 60° C.
3. Held 2 hours
4. Heated to 100° C.
5. Added DETA
6. Held 30 minutes
7. Switched to Mannich setup
8. Heated to 150° C. (cleared up at ~120° C.)
9. Pulled vacuum to 50 mm Hg
10. Held 15 minutes
11. Broke vacuum w/N$_2$
12. Cooled and discharged

|  | 1st Batch | 2nd Batch |
| --- | --- | --- |
| Product Clarity | Clear, no haze | Clear, no haze |
| Color | 8 | — |
| AmV | 417 | 412 |
| Visc @ 25° C. | 193 poise |  |
| AHEW | — | 276.8 |
| Gel Time (130.1/69.9) | 16' 41" | — |

EXAMPLE 3

|  | Wt. Ratio | Wt. % | grams |
| --- | --- | --- | --- |
| Paraformaldehyde 95% | 63.16 | 5.61 | 38.4 |
| p-t-Butyl Phenol | 15. | 1.33 | 9.1 |
| DI H$_2$O | 100. | 8.88 | 60.8 |
| BDMA | 10. | .89 | 6.1 |
| Nonyl Phenol | 638. | 56.65 | 387.8 |

-continued

|  | Wt. Ratio | Wt. % | grams |
|---|---|---|---|
| TMD* | 15.8 | 1.40 | 9.6 |
| MXDA | 248.24 | 25.24 | 172.8 |
|  | 1126.20 | 100.00 | 684.6 |
| Water loss | −139.16 | −12.36 | −84.6 |
| Yield | 987.04 | 87.64 | 600.00 |

*trimethylhexamethylenediamine

1. Added first five ingredients, in order, to reactor with cold condenser
2. Heated slowly to 100° C.
3. Held 2 hours
4. Added TMD
5. Mixed 15 minutes
6. Added MXDA
7. Mixed 30 minutes
8. Switched to Mannich setup
9. Heated to 150° C.
10. Pulled vacuum to 50 mm Hg
11. Held 15 minutes
12. Broke vacuum w/N₂ cooled and discharged

|  | 1st Batch | 2nd Batch |
|---|---|---|
| Product Clarity | clear, no haze | clear, no haze |
| Color | 4–5 | 4 |
| AmV | 257.45 | 256.71 |
| Visc @ 25° C. | 1010 poise | 881 poise |
| AHEW | — | — |
| Gel Time (111.8/88.2) | 17' 40" | 16' 12" |

EXAMPLE 4

|  | Wt. Ratio | Wt. % | grams |
|---|---|---|---|
| Paraformaldehyde 95% | 63.16 | 5.59 | 89.2 |
| p-t-Butyl Phenol | 4.5 | .39 | 6.4 |
| DI H₂O | 100. | 8.85 | 141.2 |
| BDMA | 10. | .89 | 14.1 |
| Nonyl Phenol | 653.4 | 57.80 | 922.8 |
| TMD | 4.5 | .39 | 6.4 |
| MXDA | 294.94 | 26.09 | 416.5 |
|  | 1130.5 | 100.00 | 1596.6 |
| Water loss | −139.16 | −12.31 | −196.5 |
| Yield | 991.34 | 87.69 | 1400.10 |

1. Added first five ingredients, in order, to reactor
2. Heated slowly to 100° C.
3. Held 2 hours
4. Added TMD
5. Mixed 15 minutes
6. Added MXDA
7. Mixed 30 minutes
8. Switched to Mannich setup
9. Heated to 150° C.
10. Pulled vacuum to 50 mm Hg
11. Held 15 minutes
12. Broke vacuum w/N₂; cooled and discharged

| Product Clarity | Clear, no haze |
|---|---|
| Visc @ 25° C. | 825 poise |

EXAMPLE 5

|  | Wt. Ratio | Wt. % |
|---|---|---|
| Paraformaldehyde 95% | 63.16 | 5.51 |
| DI H₂O | 100. | 8.73 |
| BDMA | 10. | .87 |
| Nonyl Phenol | 660. | 57.62 |
| 1,3-BAC* | 312.4 | 27.27 |
|  | 1145.56 | 100.00 |
| Water loss | −139.16 | −12.15 |
| Yield | 1006.40 | 87.85 |

*1,3-cyclohexanedimethanamine

1. Added first four ingredients, in order, to reactor
2. Heated slowly to 60° C.
3. Held 2 hours
4. Heated to 100° C.
5. Added 1,3-BAC
6. Held 30 minutes
7. Switched to Mannich setup
8. Heated to 150° C.
9. Pulled vacuum to 50 mm Hg
10. Held 15 minutes
11. Broke vacuum with N₂
12. Cooled and discharged

| Product Clarity | Clear, no haze |
|---|---|
| Color | 5–6 |
| Visc @ 25° C. | 2125 poise |
| Gel Time (112.4/87.6) | 16' 46" |

EXAMPLE 6

|  | Wt. Ratio | Wt. % | grams |
|---|---|---|---|
| Paraformaldehyde 95% | 63.16 | 5.60 | 38.3 |
| DI H₂O | 100. | 8.86 | 60.7 |
| BDMA | 10.6 | .94 | 6.4 |
| Nonyl Phenol | 660. | 58.51 | 400.4 |
| DETA | 294.3 | 26.09 | 178.6 |
|  | 1128.06 | 100.00 | 684.4 |
| Water loss | −139.16 | −12.34 | −84.4 |
| Yield | 988.90 | 87.66 | 600.00 |

1. Added first four ingredients, in order, to reactor
2. Heated slowly to 60° C.
3. Held 2 hours
4. Heated to 100° C.
5. Added DETA
6. Held 30 minutes
7. Switched to Mannich setup
8. Heated to 150° C. (cleared at ~118° C.)

9. Pulled vacuum to 50 mm Hg
10. Held 15 minutes
11. Broke vacuum with N$_2$
12. Cooled and discharged

| Product Clarity | Clear, no haze |
|---|---|
| Color | 8 |
| AmV | 482 |
| Visc @ 25° C. | 63 poise |
| Gel Time (140.7/59.3) | 16' 32" |

EXAMPLE 7

|  | Wt. Ratio | Wt. % | grams |
|---|---|---|---|
| DI H$_2$O | 148. | 13.72 | 101.9 |
| BDMA | 10.78 | 1.00 | 7.4 |
| Paraformaldehyde 95% | 94.74 | 8.79 | 65.2 |
| Phenol | 376. | 34.87 | 258.8 |
| MXDA | 448.8 | 41.62 | 309.0 |
|  | 1078.32 | 100.00 | 742.3 |
| Water loss | −206.74 | −19.17 | −142.3 |
| Yield | 871.58 | 80.83 | 600.00 |

1. Added first four ingredients to reactor with cold condenser
2. Heated to 60° C.
3. Held 2 hours
4. Heated to 100° C.
5. Added MXDA
6. Held 30 minutes
7. Switched to Mannich setup
8. Heated to 150° C.
9. Pulled vacuum to 50 mm Hg
10. Held 15 minutes
11. Broke vacuum with N$_2$
12. Cooled and discharged

| Product Clarity | Clear, no haze |
|---|---|
| AmV | 443 |
| Visc @ 25° C. | 472 poise |
| Gel Time (137.9/62.1) | 6' 45" |
| Tach-Free | 60' (1:00) |
| Thru-Cure | 67.5' (1:075/1.128) |

EXAMPLE 8

|  | Wt. Ratio | grams |
|---|---|---|
| Paraformaldehyde 95% | 63.16 | 69.5 |
| DI H$_2$O | 126.32 | 139.0 |
| p-t-Butyl Phenol | 150. | 165.0 |
| DETA (1) | 6. | 6.6 |
| DETA (2) | 200.0 | 220.0 |
|  | 545.48 | 600.1 |
| Water loss | −165.48 | −182.0 |
| Yield | 380.00 | 418.10 |

1. Added first four ingredients to reactor with cold condenser
2. Heated slowly to 100° C.
3. Held 2 hours
4. Added DETA (2)
5. Switched to Mannich setup
6. Heated slowly to 150° C. At 150° C., batch cleared up completely, albeit dark color
7. At 150° C., pulled vacuum to 50 mm Hg; held 15 minutes
8. Broke vacuum with N$_2$; cooled and discharged

| Product Clarity | Clear, no haze |
|---|---|
| Color | 15 |
| AmV | 853 |
| Visc @ 25° C. | 62.75 poise |

EXAMPLE 9

|  | Wt. Ratio | grams |
|---|---|---|
| Paraformaldehyde 95% | 63.16 | 61.0 |
| DI H$_2$O | 126.32 | 122.0 |
| MXDA (1) | 5. | 4.8 |
| TMD | 5. | 4.8 |
| Nonyl Phenol | 5. | 4.8 |
| p-t-Butyl Phenol | 150. | 144.8 |
| MXDA (2) | 267.0 | 257.8 |
|  | 621.48 | 600.0 |
| Water loss | −165.48 | −159.8 |
| Yield | 456.00 | 440.20 |

1. Added first six ingredients to reactor equipped with cold condenser
2. Heated slowly to 100° C.
3. Held 2 hours
4. Added MXDA (2)
5. Held 30 minutes
6. Switched to hot air condenser to reactor, connector to cold condenser, vacuum connection, and receiver
7. Heated slowly to 150° C.
8. At 150° C., pulled vacuum to 50 mm Hg; held 15 minutes
9. Broke vacuum with N$_2$; cooled and discharged

| Product Clarity | Clear, no haze |
|---|---|
| Color | 7 |
| AmV | 513 |
| Visc @ 25° C. | 765 poise |

EXAMPLE 10

|  | Wt. Ratio | Wt. % | grams |
|---|---|---|---|
| Paraformaldehyde 95% | 63.16 | 9.67 | 67.7 |
| DI H$_2$O | 126.32 | 19.33 | 135.3 |
| TETA | 314. | 48.05 | 336.4 |
| p-t-Butyl Phenol | 150. | 22.95 | 160.7 |
|  | 653.48 | 100.00 | 700.10 |

1. Add ingredients in order to reactor equipped with cold condenser
2. Heat slowly to 100° C.
3. Hold 2 hours
4. Switch to hot air condenser to reactor, connector to cold condenser, vacuum connection, and receiver 5. Heat slowly to 150° C.
6. At temp, pull vacuum to 50 mm Hg; hold 15 minutes
7. Break vacuum with $N_2$
8. Cool and discharge

EXAMPLE 11

|  | Wt. Ratio | Wt. % | grams |
|---|---|---|---|
| Paraformaldehyde 95% | 63.16 | 11.58 | 81.1 |
| DI $H_2O$ | 126.32 | 23.16 | 162.1 |
| DETA | 206. | 37.76 | 264.4 |
| p-t-Butyl Phenol | 150. | 27.50 | 192.5 |
|  | 545.48 | 100.00 | 700.00 |

1. Add ingredients in order to reactor equipped with cold condenser
2. Heat slowly to 100° C.
3. Hold 2 hours
4 Switch to hot air condenser to reactor, connector to cold condenser, vacuum connection, and receiver
5 Heat slowly to 150° C.
6 At 150° C., pull vacuum to 50 mm Hg; hold 15 minutes
7. Break vacuum with $N_2$
8. Cool and discharge

EXAMPLE 12

|  | Wt. Ratio | Wt. % | grams |
|---|---|---|---|
| MXDA | 47. | 56.63 | 1812.2 |
| Nonyl Phenol | 5. | 6.02 | 192.6 |
| Bisphenol A | 25. | 30.12 | 963.8 |
| DER ™ 331 | 6. | 7.23 | 231.4 |
|  | 83.00 | 100.00 | 3200.00 |

1. Added first 3 ingredients to reactor
2. Mixed until uniform
3. Pulled vacuum to 25" to exclude occluded air
4. Held 15 minutes; broke vacuum with nitrogen
5. Heated to 60° C.
6. Slowly added DER™331 to reactor; controlled exotherm <120° C.
7. When exotherm subsided, heated to 160° C.
8. Held 1 hour
9. Cooled & discharged

|  | Specs | Batch 1 | Batch 2 |
|---|---|---|---|
| Clarity | Clear, no haze | OK | OK |
| Color | 5 Max | 1 | 1–2 |
| AmV | ~467 | 476.5 | 468.3 |
| Visc @ 25° C. (poise) | 20–30 | 23.75 | 22.45 |
| AHEW (info only) | 61.4 | — | — |
| Gel Time (151.2/48.8) | ~10' | 9' 1" | 9' 52" |

EXAMPLE 13

|  | Wt. % | grams |
|---|---|---|
| 1,3-BAC | 56.7 | 1814.4 |
| Nonyl Phenol | 6.0 | 192.0 |
| Bisphenol A | 30.1 | 963.2 |
| DER ™ 331 | 7.2 | 230.4 |
|  | 100.00 | 3200.00 |

1. Added first 3 ingredients to reactor
2. Mixed until uniform
3. Pulled vacuum to 25° to exclude occluded air
4. Held 15 minutes; broke vacuum with nitrogen
5. Heated to 60° C.
6. Slowly added DER™331 to reactor; controlled exotherm <120° C.
7. When exotherm subsided, heated to 160° C.
8. Held 1 hour
9. Cooled & discharged

|  | Specs | Batch 1 | Batch 2 |
|---|---|---|---|
| Clarity | Clear, no haze | OK | OK |
| Color | 5 Max | 1 | <1 |
| AmV | ~448 | 449.2 | 455.6 |
| Visc @ 25° C. (poise) | 65–75 | 66.12 | 73 |
| AHEW | 64.1 | — | — |
| Gel Time (149.5/50.5) | 8–10' | — | 8' 5" |

What is claimed is:

1. An epoxy curing agent formed by the process comprising the steps of: (1) reacting a phenol with an aldehyde in the presence of a catalytically effective amount of a basic catalyst to form a first reaction product; (2) reacting the first reaction product with a polyamine or a polyamine-epoxy adduct to form a second reaction product containing unreacted primary amine groups; (3) reacting the second reaction product with a proton donor compound having a $pk_a$ value of 11 or less to form the epoxy curing agent; and wherein at least about 0.8 equivalents of proton donor are present per equivalent of primary amine groups in said second reaction product.

2. The epoxy curing agent of claim 1 wherein at least about 1 equivalent of proton donor is present per equivalent of primary amine groups.

3. The epoxy curing agent of claim 1, wherein in step (1) the phenol has the formula

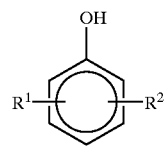

wherein $R^1$ and $R^2$ are independently hydrogens or hydrocarbyl groups having from 1 to 16 carbon atoms.

4. The epoxy curing agent of claim 1 wherein the polyamine in step (2) has the formula $$H_2N-(-R^3-NH-)_m-(R^4-)_n-NH_2$$

wherein $R^3$ and $R^4$ are divalent hydrocarbyl groups having 2 to about 20 carbon atoms, and m and n are integers ranging from 0 to 5, provided that m+n is equal to at least 1.

5. The epoxy curing agent of claim 1 wherein in step (2) the aldehyde is formaldehyde or paraformaldehyde.

6. A process for the preparation of an epoxy curing agent comprising the steps of:
(1) reacting a phenol with an aldehyde in the presence of a catalytically effective amount of a basic catalyst to form a first reaction product;
(2) reacting the first reaction product with a polyamine or a polyamine-epoxy adduct to form a second reaction product containing unreacted primary amine groups;
(3) reacting the second reaction product with a proton donor compound having a $pK_a$ value of 11 or less to form the epoxy curing agent, and wherein at least about 0.8 equivalents of proton donor are present per equivalent of primary amine groups in said second reaction product.

7. The process of claim 6, wherein at least about 1 equivalent of proton donor is present per equivalent of primary amine groups.

8. The process of claim 6 wherein in step (1) the phenol has the formula

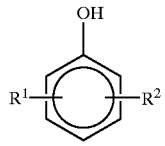

wherein $R^1$ and $R^2$ are independently hydrogens or hydrocarbyl groups having from 1 to 16 carbon atoms, and wherein the polyamine in step (2) has the formula

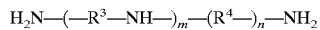

wherein $R^3$ and $R^4$ divalent hydrocarbyl groups having 2 to about 20 carbon atoms, and m and n are integers ranging from 0 to 5, provided that m+n is equal to at least 1.

* * * * *